(12) United States Patent
Rabbat et al.

(10) Patent No.: US 10,945,042 B2
(45) Date of Patent: Mar. 9, 2021

(54) GENERATING AN INTERACTIVE DIGITAL VIDEO CONTENT ITEM

(71) Applicant: Gfycat, Inc., Palo Alto, CA (US)

(72) Inventors: Richard Rabbat, Palo Alto, CA (US); Ernestine Fu, Northridge, CA (US)

(73) Assignee: Gfycat, Inc., Palo Alto, CA (US)

( * ) Notice: Subject to any disclaimer, the term of this patent is extended or adjusted under 35 U.S.C. 154(b) by 0 days.

(21) Appl. No.: 16/195,458

(22) Filed: Nov. 19, 2018

(65) Prior Publication Data

US 2020/0162792 A1    May 21, 2020

(51) Int. Cl.
| | | |
|---|---|---|
| G11B 27/00 | (2006.01) |
| H04N 5/93 | (2006.01) |
| H04N 21/4725 | (2011.01) |
| G11B 27/036 | (2006.01) |
| G06K 9/00 | (2006.01) |
| H04N 21/44 | (2011.01) |
| H04N 21/858 | (2011.01) |
| H04N 21/8545 | (2011.01) |
| H04N 9/80 | (2006.01) |

(52) U.S. Cl.
CPC ..... *H04N 21/4725* (2013.01); *G06K 9/00228* (2013.01); *G06K 9/00744* (2013.01); *G11B 27/036* (2013.01); *H04N 21/44008* (2013.01); *H04N 21/8545* (2013.01); *H04N 21/8586* (2013.01)

(58) Field of Classification Search
USPC ............... 386/280, 278, 282, 239, 241, 248
See application file for complete search history.

(56) References Cited

U.S. PATENT DOCUMENTS

| | | | |
|---|---|---|---|
| 8,209,223 B2 * | 6/2012 | Fink ...................... | G06Q 30/02 |
| | | | 705/14.4 |
| 8,656,282 B2 * | 2/2014 | Kulas .................. | G06F 3/04842 |
| | | | 715/723 |
| 8,681,178 B1 | 3/2014 | Tseng | |
| 9,148,643 B2 * | 9/2015 | Walker .................. | H04N 21/00 |
| 9,349,414 B1 | 5/2016 | Furment et al. | |
| 9,652,896 B1 | 5/2017 | Jurgenson et al. | |

(Continued)

FOREIGN PATENT DOCUMENTS

WO    WO-2018159168 A1    9/2018

OTHER PUBLICATIONS

"U.S. Appl. No. 15/816,117, Final Office Action dated Jun. 11, 2020", 10 pgs.

(Continued)

*Primary Examiner* — Daquan Zhao
(74) *Attorney, Agent, or Firm* — Schwegman Lundberg & Woessner, P.A.

(57) ABSTRACT

In a computer-implemented method for generating an interactive digital video content item, a digital video content item is accessed. Subject recognition is performed on the digital video content item, wherein the subject recognition automatically identifies a visual subject within the digital video content item. Responsive to identifying the visual subject, an interactive region is applied to visual subject within the digital video content item, wherein the interactive region enables presentation of content related to the visual subject in response to a user interaction with the interactive region during presentation of the digital video content item.

20 Claims, 11 Drawing Sheets

(56) References Cited

U.S. PATENT DOCUMENTS

| | | | |
|---|---|---|---|
| 9,984,499 B1 | 5/2018 | Jurgenson et al. | |
| 10,008,240 B2* | 6/2018 | Koide | G11B 27/036 |
| 2010/0257252 A1 | 10/2010 | Dougherty et al. | |
| 2012/0308192 A1 | 12/2012 | Chung et al. | |
| 2014/0245335 A1 | 8/2014 | Holden et al. | |
| 2015/0261003 A1 | 9/2015 | Morifuji et al. | |
| 2017/0236331 A1 | 8/2017 | Bryson et al. | |
| 2018/0061072 A1 | 3/2018 | Benezra et al. | |
| 2018/0190324 A1* | 7/2018 | Paul | G06F 17/5009 |
| 2018/0352172 A1 | 12/2018 | Hansbrough et al. | |
| 2019/0158797 A1 | 5/2019 | Rabbat et al. | |
| 2019/0158910 A1 | 5/2019 | Rabbat et al. | |
| 2020/0068132 A1 | 2/2020 | Lin et al. | |

OTHER PUBLICATIONS

"U.S. Appl. No. 15/816,117, Final Office Action dated Aug. 14, 2019", 8 pgs.

"U.S. Appl. No. 15/816,117, Non Final Office Action dated Feb. 7, 2019", 7 pgs.

"U.S. Appl. No. 15/816,117, Non Final Office Action dated Dec. 2, 2019", 8 pgs.

"U.S. Appl. No. 15/816,117, Response filed Feb. 2, 2020 to Non Final Office Action dated Dec. 2, 2019", 19 pgs.

"U.S. Appl. No. 15/816,117, Response filed Apr. 29, 2019 to Non Final Office Action dated Feb. 7, 2019", 12 pgs.

"U.S. Appl. No. 15/816,117, Response filed Oct. 6, 2020 to Final Office Action dated Jun. 11, 2020", 12 pgs.

"U.S. Appl. No. 15/816,117, Response filed Nov. 13, 2019 to Final Office Action dated Aug. 14, 2019", 14 pgs.

"U.S. Appl. No. 15/816,275, Advisory Action dated Jul. 21, 2020", 5 pgs.

"U.S. Appl. No. 15/816,275, Final Office Action dated May 6, 2020", 11 pgs.

"U.S. Appl. No. 15/816,275, Final Office Action dated Oct. 9, 2019", 10 pgs.

"U.S. Appl. No. 15/816,275, Non Final Office Action dated Jan. 23, 2020", 10 pgs.

"U.S. Appl. No. 15/816,275, Non Final Office Action dated Mar. 28, 2019", 8 pgs.

"U.S. Appl. No. 15/816,275, Non Final Office Action dated Aug. 21, 2020", 11 pgs.

"U.S. Appl. No. 15/816,275, Response filed Jan. 8, 2020 to Final Office Action dated Oct. 9, 2019", 12 pgs.

"U.S. Appl. No. 15/816,275, Response filed Apr. 23, 2020 to Non Final Office Action dated Jan. 23, 2020", 14 pgs.

"U.S. Appl. No. 15/816,275, Response filed Jun. 18, 2019 to Non Final Office Action dated Mar. 28, 2019", 12 pgs.

"U.S. Appl. No. 15/816,275, Response filed Jul. 2, 2020 to Final Office Action dated May 6, 2020" 8 pgs.

"U.S. Appl. No. 15/816,275, Response filed Aug. 5, 2020 to Advisory Action dated Jul. 21, 2020", 9 pgs.

\* cited by examiner

GENERATING AN INTERACTIVE DIGITAL VIDEO CONTENT ITEM

BACKGROUND

Media files, such as audio and video files, are used in a variety of environments for conveying many types of information. For example, media files can be streamed or otherwise communicated over computer networks, allowing users to view and/or listen to the media content. Conventionally, video content is a one-directional medium such that a content provider provides the video content to a user for viewing. With the advent of the Internet, the amount of video content available to users has grown exponentially, as has the media platforms upon which the video content is available for viewing.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

DESCRIPTION OF EMBODIMENTS

Figure 1:
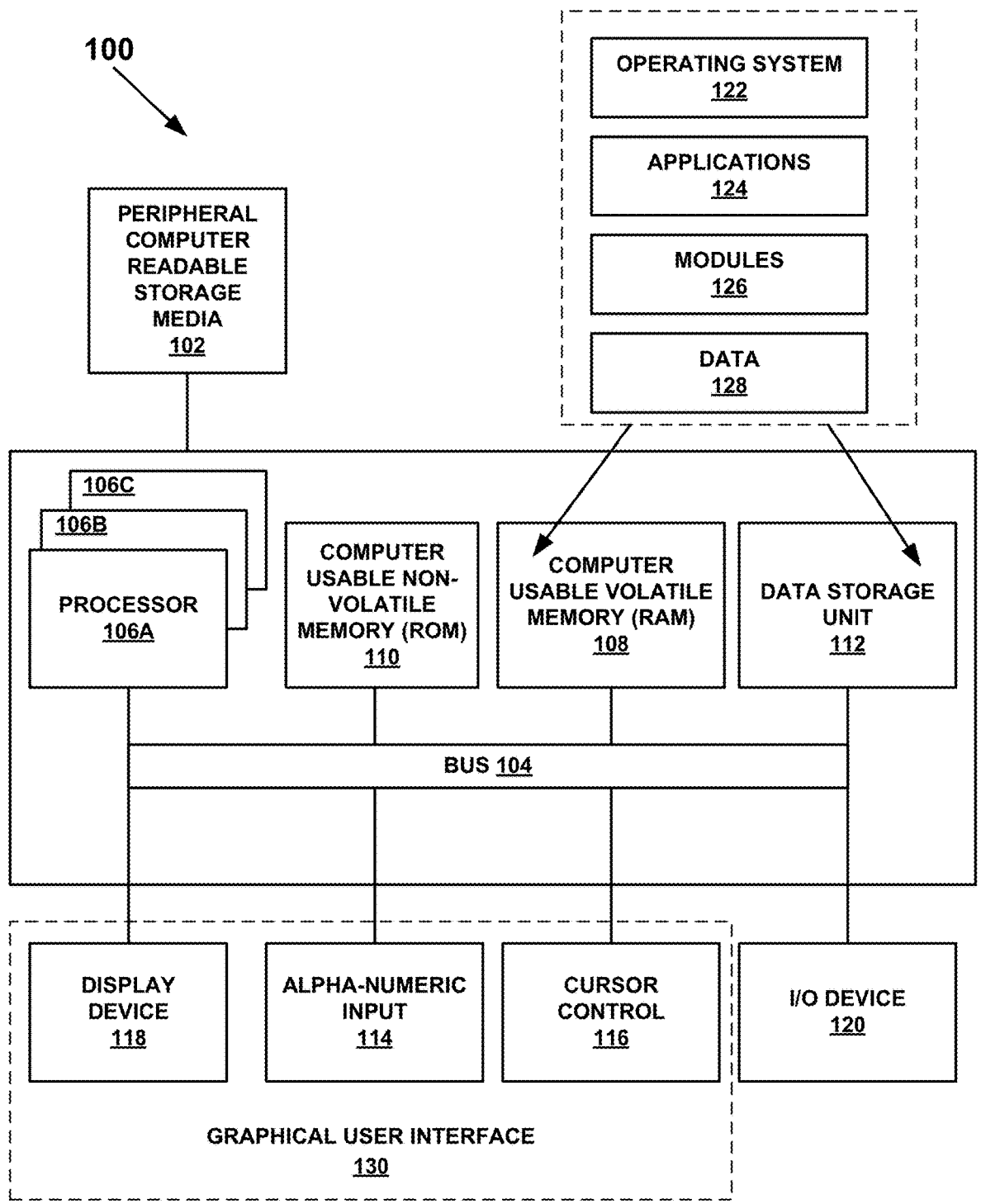
FIG. 1 illustrates an example computer system upon which embodiments described herein be implemented.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "accessing," "performing," "identifying," "applying," "accessing," "comparing," "displaying," "detecting," "presenting," or the like, refer to the actions and processes of an electronic device such as: a processor, a processor, an optical sensor, a sensor, a memory, a mobile electronic device, a sensor processing unit, a sensor processor, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example computer system upon which embodiments of the present invention may be implemented. Examples of the generation of interactive digital video items and the use of interactive digital video items are then described. Example operations of generating and using an interactive digital video item are then described.

In accordance with various embodiments, methods and systems for generating an interactive digital video item are provided. A digital video content item is accessed. Subject recognition is performed on the digital video content item, wherein the subject recognition automatically identifies a visual subject within the digital video content item. Responsive to identifying the visual subject, an interactive region is applied to visual subject within the digital video content item, wherein the interactive region enables presentation of content related to the visual subject in response to a user interaction with the interactive region during presentation of the digital video content item.

Video content is a useful medium by which to convey visual information to a user. Conventionally, video content is a one-directional medium such that a content provider provides the video content to a user for viewing. With the advent of the Internet, the amount of video content available to users has grown exponentially, as has the media platforms upon which the video content is available for viewing. Some media platforms have attempted to provide some forms of interactivity with video content. However, conventional interactive video content suffers from many significant shortcomings.

Various embodiments described herein provide for the automated generation of interactive digital video content items using subject recognition. The interactive digital video content item provides additional content related to the subject matter displayed in the digital video content item. This improves the usefulness of interactive video content by providing for the automated generation of such interactive digital video content items.

Embodiments described herein provide methods and systems for generating an interactive digital video item. A digital video content item is accessed. In one embodiment, the digital video content item is a short form looping prerecorded video file.

Subject recognition is performed on the digital video content item, wherein the subject recognition automatically identifies a visual subject within the digital video content item. In one embodiment, the subject recognition comprises facial recognition. In one embodiment, the subject recognition comprises object recognition. In one embodiment, the performing subject recognition on the digital video content item is performed by accessing a library of recognizable visual subjects. The visual subject is compared to the library of recognizable visual subjects. The visual subject is identified as a recognizable visual subject of the library of recognizable visual subjects.

Responsive to identifying the visual subject, an interactive region is applied to visual subject within the digital video content item, wherein the interactive region enables presentation of content related to the visual subject in response to a user interaction with the interactive region during presentation of the digital video content item. In one embodiment, the content comprises a uniform resource locator.

In one embodiment, the digital video content item comprising the interactive region is displayed on a display device of an electronic device. Responsive to detecting an interaction with the interactive region, presenting the content related to the visual subject.

Embodiments described herein pertain to the generation of an interactive digital video content item. In one embodiment, the interactive digital video content item is a Graphics Interchange Format (GIF) file. While embodiments described herein pertain to GIF files, it should be appreciated that other types of prerecorded media files, such as other types of video files, can be used herein. Moreover, it should be appreciated that any type of video file format can be used in accordance with the described embodiments, including but not limited to GIF, WebM, WebP, MPEG-4 (MP4), Animated Portable Network Graphics (APNG), Motion JPEG, Flash video (FLV), Windows Media video, M4V, etc. It should be appreciated that the interactive digital video content item can be looped (e.g., via a HTML 5 video element or Flash video element) to automatically repeat.

Embodiments described herein provide for the automated generation of interactive digital video content items. In response to a user interaction with an interactive region of the interactive digital video content item, content can be presented that is related to the visual subject of the interactive digital video content item. The described embodiments improve the efficiency and usefulness of interactive video content by providing for the automated generation of interactive digital video content items for presenting additional content related to the interactive digital video content item.

Example Computer System and Mobile Electronic Device

Turning now to the figures, FIG. 1 is a block diagram of an example computer system 100 upon which embodiments of the present invention can be implemented. FIG. 1 illustrates one example of a type of computer system 100 (e.g., a computer system) that can be used in accordance with or to implement various embodiments which are discussed herein.

It is appreciated that computer system 100 of FIG. 1 is only an example and that embodiments as described herein can operate on or within a number of different computer systems including, but not limited to, general purpose networked computer systems, embedded computer systems, mobile electronic devices, smart phones, server devices, client devices, various intermediate devices/nodes, stand-alone computer systems, media centers, handheld computer systems, multi-media devices, and the like. In some embodiments, computer system 100 of FIG. 1 is well adapted to having peripheral tangible computer-readable storage media 102 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

Computer system 100 of FIG. 1 includes an address/data bus 104 for communicating information, and a processor 106A coupled with bus 104 for processing information and instructions. As depicted in FIG. 1, computer system 100 is also well suited to a multi-processor environment in which a plurality of processors 106A, 106B, and 106C are present. Conversely, computer system 100 is also well suited to having a single processor such as, for example, processor 106A. Processors 106A, 106B, and 106C may be any of various types of microprocessors. Computer system 100 also includes data storage features such as a computer usable volatile memory 108, e.g., random access memory (RAM), coupled with bus 104 for storing information and instructions for processors 106A, 106B, and 106C. Computer system 100 also includes computer usable non-volatile memory 110, e.g., read only memory (ROM), coupled with bus 104 for storing static information and instructions for processors 106A, 106B, and 106C. Also present in computer system 100 is a data storage unit 112 (e.g., a magnetic or optical disc and disc drive) coupled with bus 104 for storing information and instructions. Computer system 100 also includes an alphanumeric input device 114 including alphanumeric and function keys coupled with bus 104 for communicating information and command selections to processor 106A or processors 106A, 1066, and 106C. Computer system 100 also includes an cursor control device 116 coupled with bus 104 for communicating user input information and command selections to processor 106A or processors 106A, 106B, and 106C. In one embodiment, computer system 100 also includes a display device 118 coupled with bus 104 for displaying information.

Referring still to FIG. 1, display device 118 of FIG. 1 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 116 allows the computer user to dynamically signal the movement of a visible symbol (cursor) on a display screen of display device 118 and indicate user selections of selectable items displayed on display device 118. Many implementations of cursor control device 116 are known in the art including a trackball, mouse, touch pad, touch screen, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. Computer system 100 is also well suited to having a cursor directed by other means such as, for example, voice commands. In various embodiments, alphanumeric input device 114, cursor control device 116, and display device 118, or any combination thereof (e.g., user interface selection devices), may collectively operate to provide a graphical user interface (GUI) 130 under the direction of a processor (e.g., processor 106A or processors 106A, 106B, and 106C). GUI 130 allows user to interact with computer system 100 through graphical representations presented on display device 118 by interacting with alphanumeric input device 114 and/or cursor control device 116.

Computer system 100 also includes an I/O device 120 for coupling computer system 100 with external entities. For example, in one embodiment, I/O device 120 is a modem for enabling wired or wireless communications between computer system 100 and an external network such as, but not limited to, the Internet. In one embodiment, I/O device 120 includes a transmitter. Computer system 100 may communicate with a network by transmitting data via I/O device 120.

Referring still to FIG. 1, various other components are depicted for computer system 100. Specifically, when present, an operating system 122, applications 124, modules 126, and data 128 are shown as typically residing in one or some combination of computer usable volatile memory 108 (e.g., RAM), computer usable non-volatile memory 110 (e.g., ROM), and data storage unit 112. In some embodiments, all or portions of various embodiments described herein are stored, for example, as an application 124 and/or module 126 in memory locations within RAM 108, computer-readable storage media within data storage unit 112, peripheral computer-readable storage media 102, and/or other tangible computer-readable storage media.

Figure 2:
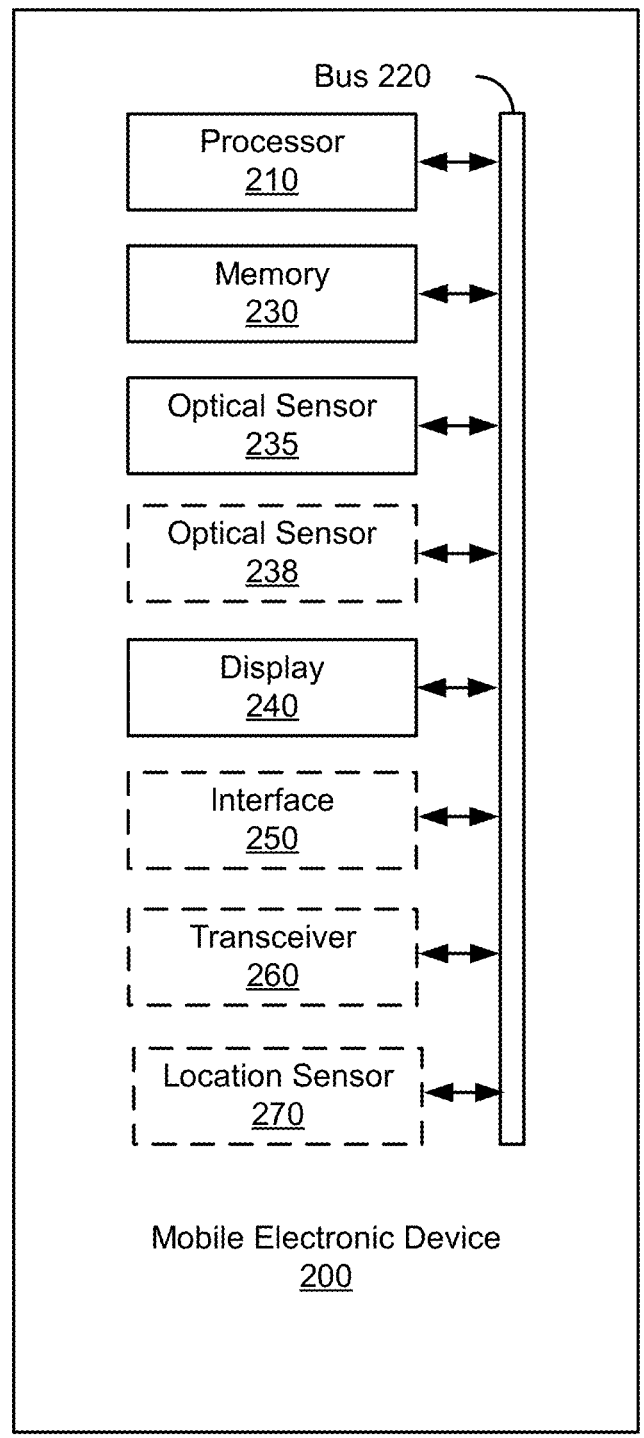
FIG. 2 illustrates an example mobile electronic device upon which embodiments described herein be implemented.

Turning now FIG. 2, a block diagram of an example mobile electronic device 200 is shown. As will be appreciated, mobile electronic device 200 may be implemented as a device or apparatus, such as a handheld mobile electronic device, that can be moved in space by a human user. That is, mobile electronic device 200 is small enough to be held in the hand of a human user, in various embodiments. For example, such a mobile electronic device may be, without limitation, a mobile telephone phone (e.g., smartphone, cellular phone, a cordless phone running on a local network, or any other cordless telephone handset), a wired telephone (e.g., a phone attached by a wire), a personal digital assistant (PDA), a video game player, video game controller, a navigation device, an activity or fitness tracker device (e.g., bracelet, clip, band, or pendant), a smart watch or other wearable device, a mobile internet device (MID), a personal navigation device (PND), a digital still camera, a digital video camera, a portable music player, a portable video player, a portable multi-media player, a remote control, a headset, or a combination of one or more of these devices.

As depicted in FIG. 2, mobile electronic device 200 may include a processor 210, a bus 220, a memory 230, at least one optical sensor 235, and a display 240. Some embodiments of mobile electronic device 200 may further include one or more of an interface 250, a transceiver 260 (all depicted in dashed lines), a location sensor 270, and/or other components. In various embodiments, electrical power for mobile electronic device 200 is provided by a mobile power source such as a battery, when not being actively charged.

Processor 210 can be one or more microprocessors, central processing units (CPUs), DSPs, general purpose microprocessors, ASICs, ASIPs, FPGAs or other processors which run software programs or applications, which may be stored in memory 230, associated with the functions and capabilities of mobile electronic device 200.

Bus 220 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. In the embodiment shown, processor 210, memory 230, display 240, interface 250, transceiver 260, and other components of mobile electronic device 200 may be coupled communicatively through bus 220 in order to exchange commands and data. Depending on the architecture, different bus configurations may be employed as desired. For example, additional buses may be used to couple the various components of mobile electronic device 200, such as by using a dedicated bus between processor 210 and memory 230.

Memory 230 can be any suitable type of memory, including but not limited to electronic memory (e.g., read only memory (ROM), random access memory, or other electronic memory), hard disk, optical disk, or some combination thereof. Multiple layers of software can be stored in memory 230 for use with/operation upon processor 210. For example, an operating system layer can be provided for mobile electronic device 200 to control and manage system resources in real time, enable functions of application software and other layers, and interface application programs with other software and functions of mobile electronic device 200. Similarly, a user experience system layer may operate upon or be facilitated by the operating system. The user experience system may comprise one or more software application programs such as menu navigation software, games, device function control, gesture recognition, image processing or adjusting, voice recognition, navigation software, communications software (such as telephony or wireless local area network (WLAN) software), and/or any of a wide variety of other software and functional interfaces for interaction with the user can be provided. In some embodiments, multiple different applications can be provided on a single mobile electronic device 200, and in some of those embodiments, multiple applications can run simultaneously as part of the user experience system. In some embodiments, the user experience system, operating system, and/or the processor 210 may operate in a low-power mode (e.g., a sleep mode) where very few instructions are processed. Such a low-power mode may utilize only a small fraction of the processing power of a full-power mode (e.g., an awake mode) of the processor 210.

Optical sensor 235 may comprise, without limitation: a video capture device, a camera, and infrared camera, or other type of optical sensor for capturing a video of a person, an object, and/or a scene. It should be appreciated that mobile electronic device 200 may include more than one optical sensor. In one example, optical sensor 235 is a back-side optical sensor (e.g., rear-facing camera) and optical sensor 238 is a front-side optical sensor (e.g., front-facing camera).

Display 240, may be a liquid crystal device, (organic) light emitting diode device, or other display device suitable for creating and visibly depicting graphic images and/or alphanumeric characters recognizable to a user. Display 240 may be configured to output images viewable by the user and may additionally or alternatively function as a viewfinder for camera. Display 240 is configured to display video captured at optical sensor 235 (and optical sensor 238, when included).

Interface 250, when included, can be any of a variety of different devices providing input and/or output to a user, such as audio speakers, touch screen integrated with display 240, real or virtual buttons, joystick, slider, knob, printer, scanner, computer network I/O device, other connected peripherals and the like.

Transceiver 260, when included, may be one or more of a wired or wireless transceiver which facilitates receipt of data at mobile electronic device 200 from an external transmission source and transmission of data from mobile electronic device 200 to an external recipient. By way of example, and not of limitation, in various embodiments, transceiver 260 comprises one or more of: a cellular transceiver, a wireless local area network transceiver (e.g., a transceiver compliant with one or more Institute of Electrical and Electronics Engineers (IEEE) 802.11 specifications for wireless local area network communication), a wireless personal area network transceiver (e.g., a transceiver compliant with one or more IEEE 802.15 specifications for wireless personal area network communication), and a wired a serial transceiver (e.g., a universal serial bus for wired communication).

Location sensor 270, when included, may be a sensor for determining a location of mobile electronic device 200, such as a navigation satellite system sensor such as a Global Navigation Satellite System (GNSS) receiver (e.g., Global Positioning System (GPS) sensor) a and/or other component configured to determine the location of mobile electronic device 200 from external radio signals. It is noted that the functionality of location sensor 270 may be implemented by processor 210.

Figure 3:
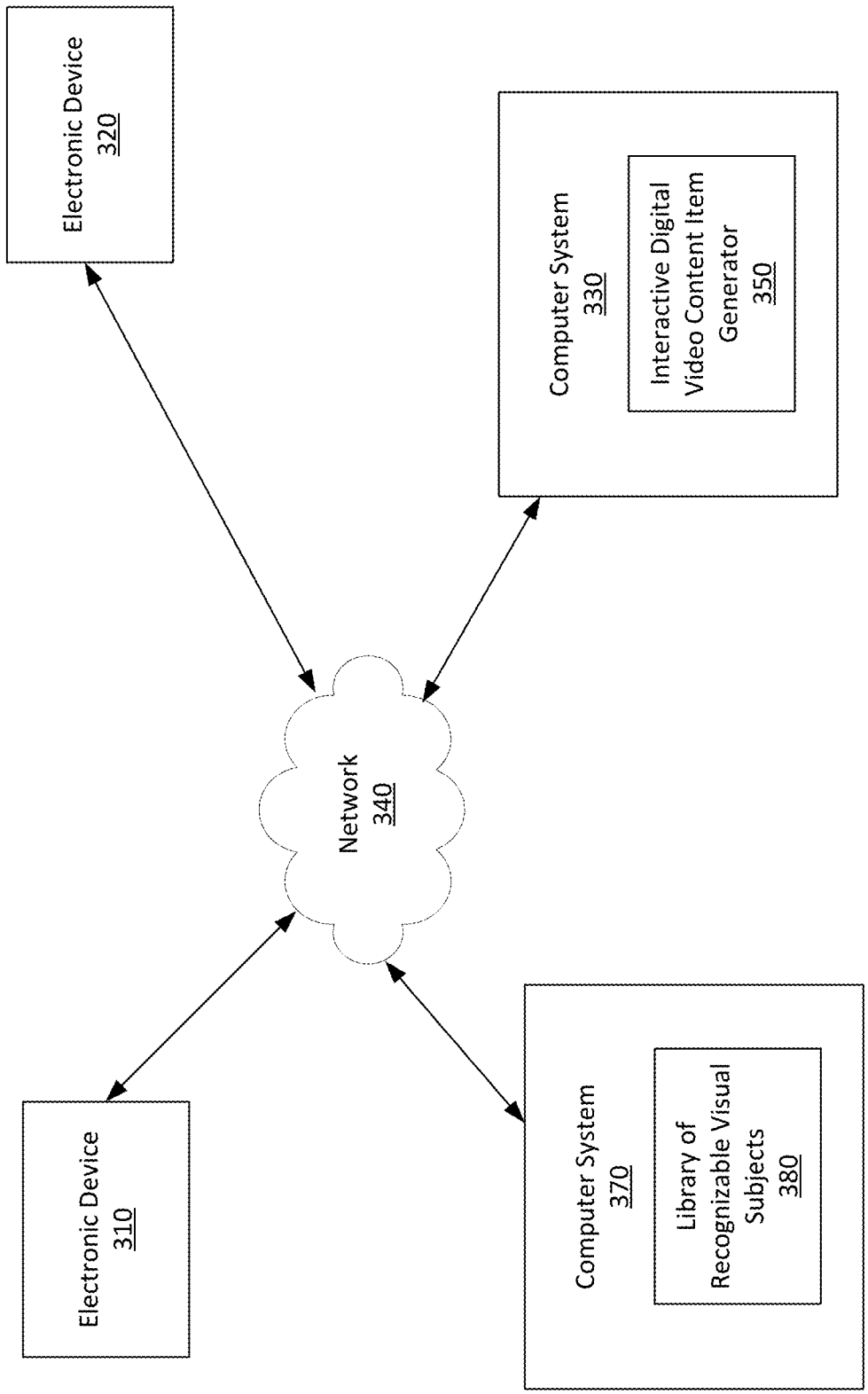
FIG. 3 illustrates an example network upon which embodiments described herein may be implemented.

FIG. 3 illustrates an example communication network 340 upon which embodiments described herein may be implemented. FIG. 3 illustrates electronic device 310, electronic device 320, computer system 330, and computer system 370, all of which are communicatively coupled via network 340. It should be appreciated that mobile electronic device 310, electronic device 320, computer system 330, and computer system 370, may be implemented as a computer system 100 or mobile electronic device 200, and/or include any combination of the components of computer system 100 or mobile electronic device 200. In some embodiments, mobile electronic device 310 and electronic device 320 are mobile electronic devices (e.g., smart phones) including messaging applications for communicating electronic messages via a graphical user interface.

In accordance with various embodiments, electronic devices 310 and 320 are capable of transmitting and receiving electronic messages including media files. Electronic devices 310 and 320 may be associated with a particular user. For example, a first user, may be associated with mobile electronic device 310 and a second user, may be associated with electronic device 320. In one embodiment, computer system 330 includes an interactive digital video content item generator 350 for generating interactive digital video content items. In one embodiment, computer system 370 includes a library of recognizable visual subjects 380 for use in performing automated subject recognition.

Example Generation and Use of an Interactive Digital Video Content Item

Figure 4:
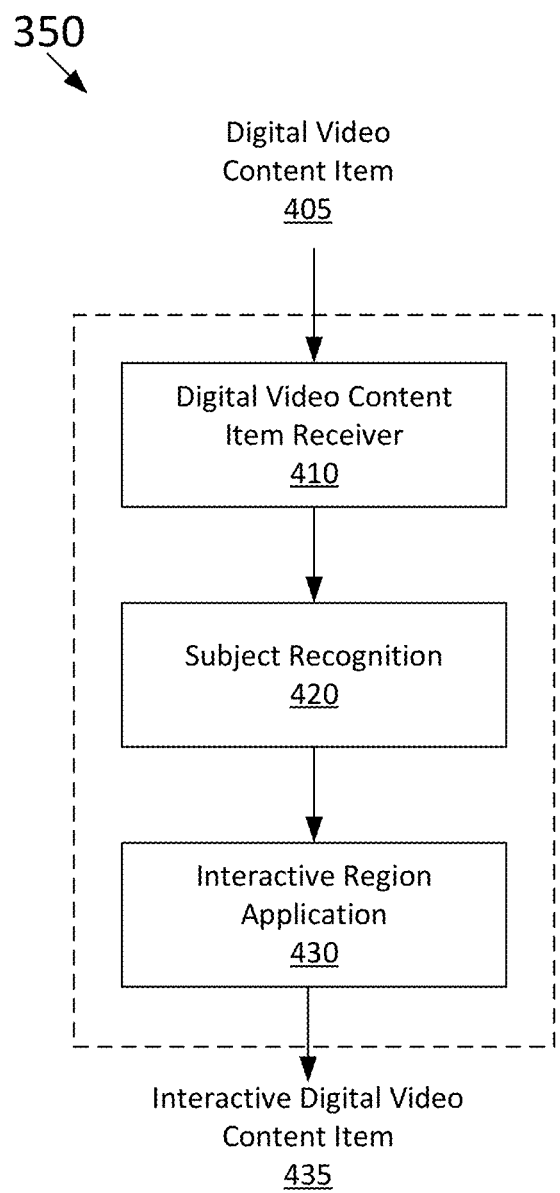
FIG. 4 illustrates an interactive digital video content item generator, in accordance with various embodiments.

FIG. 4 illustrates an interactive digital video content item generator 350, in accordance with various embodiments. Interactive digital video content item generator 350 is configured to provide for the creation of interactive digital video content items. In one embodiment, interactive digital video content item generator 350 includes digital video content item receiver 410, subject recognition 420, and interactive region application 430.

It should be appreciated that interactive digital video content item generator 350 can be implemented as hardware, software, or any combination thereof. For example, interactive digital video content item generator 350 may be executed by computer system 100 of FIG. 1. In some embodiments, individual components of interactive digital video content item generator 350 may be distributed over multiple computing devices. For example, with reference to FIG. 3, interactive digital video content item generator 350 may access and/or receive different components from computer systems communicatively coupled to network 340 (e.g., library of recognizable visual subjects 380).

Digital video content item receiver 410 is configured to receive a digital video content item 405 for displaying visual content. In some embodiments, the digital video content item 405 is received from a library of digital video content items (e.g., maintained by a service hosting prerecorded video files) over a network connection (e.g., network 340). In other embodiments, the digital video content item 405 is located on a local computer. It should be appreciated that the digital video content item 405 can be received from any source, and can have any creator. In some embodiments, the digital video content item 405 is a looping video file (e.g., automatically restarts after completing a playback). The looping functionality can be implemented within digital video content item 405 itself, within an interactive digital video content item, or within another application on the playback device. Moreover, it should be appreciated that the digital video content item 405 can be any length. In some embodiments, e.g., where the digital video content item 405 is looping, the digital video content item 405 file is less than 60 seconds in length.

In one embodiment, the video content item is a Graphics Interchange Format (GIF) file. While embodiments described herein pertain to GIF files, it should be appreciated that other types of prerecorded media files, such as other types of video files, can be used herein. Moreover, it should be appreciated that any type of media file format can be used in accordance with the described embodiments, including but not limited to GIF, WebM, WebP, MPEG-4 (MP4), Animated Portable Network Graphics (APNG), Motion JPEG, Flash video (FLV), Windows Media video, M4V, etc. It should be appreciated that video content item can be looped (e.g., via a HTML 5 video element or Flash video element) to automatically repeat. In some embodiments, the video content item is a short form looping video file (e.g., less than 60 seconds).

Subject recognition 420 is configured to perform automatic subject recognition on digital video content item 405. Automatic subject recognition analyzes digital video content item 405 and identifies or verifies at least one visual subject displayed within digital video content item 405. It should be appreciated that a visual subject refers to any content displayed within digital video content item 405, such as and without limitation: a face, an object, a logo, etc. It should also be appreciated that digital video content item 405 can include one or more visual subjects, and that more than one type of subject recognition can be performed. For example, both facial recognition and object recognition can be performed on digital video content item 405. In some embodiments, the subject recognition includes facial recognition, where facial recognition identifies a visual subject based on the face. In some embodiments, the subject recognition includes object recognition, where object recognition identifies a visual subject based on the recognizing an object.

In some embodiments, the subject recognition is configured to identify those regions of frames within digital video content item 405 that include visual subjects. It should be appreciated that different frames with digital video content item 405 can include different visual subjects, e.g., a visual subject moves in or out of the frames of digital video content item 405.

In some embodiments, the subject recognition is configured to access at least one library of recognizable visual subjects (e.g., faces or objects). Visual subjects identified within digital video content item 405 are compared to recognizable visual subjects of the one or more libraries. Based on the comparison, visual subjects are identified within digital video content item 405.

Interactive region application 430 is configured to receive information defining one or more interactive regions for receiving interactions with the digital video content item 405. An interaction can include a cursor selection, a finger touch (e.g., at a touch screen display), gestures, etc. In some embodiments, at least one interactive region is defined and included within the interactive digital video content item. An interactive region overlays or is superimposed over the digital video content item 405 during playback and defines areas of the display for receiving the interactions. The interactive region is identified based on the location of the corresponding identified visual subject within digital video content item 405.

Interactive region application 430 is further configured to associate each interactive region with content for presentation, where the content is related to the visual subject associated with the interactive region. In one embodiment, the content includes a uniform resource locator, e.g., a web address. For example, the web address can be for a web page about the visual subject, a web store for purchasing an item related to the visual subject, a web address for a coupon for the visual subject, etc.

It should be appreciated that any number of interactive regions can be defined for an interactive digital video content item. In some embodiments, different interactive regions are for providing different content. An interactive region or regions can be superimposed over an entire rendered interactive digital video content item, or an interactive region or regions can be superimposed over a portion of the rendered interactive digital video content item, leaving non-interactive portions of the rendered interactive digital video content item. In some embodiments, interactive regions move relative to digital video content item 405 during display, e.g., to track a visual subject. In some embodiments, an interactive region may only be present some frames of digital video content item 405, e.g., where the visual subject moves on or off the viewable area of digital video content item 405 during display.

For example, a digital video content item is a video of Taylor swift performing. Subject recognition is performed on the digital video content item, where facial recognition identifies Taylor Swift. An interactive region is applied to the video such that it overlays at least a portion of Taylor Swift who is the visual subject of the interactive region. The interactive region is associated with additional content related to Taylor Swift, e.g., Taylor Swift's web site. During viewing of the digital video content item, an interaction with the interactive region directs the device displaying the video to access Taylor Swift's web site, e.g., by opening a web application.

FIGS. 5A through 5J illustrate example screenshots of displayed interactive digital video content items and defined interactive regions, according to various embodiments. While FIGS. 5A through 5J illustrate outlines of interactive regions, it should be appreciated that such outlines might not be visible to a viewer and are shown to illustrate a location of an interactive region relative to an identified visual subject. It should be appreciated that an interaction is defined by the particular device or computer system with which a viewer is interacting (e.g., a touch screen on a smart phone or a mouse click with a desktop computer).

Figure 5A:
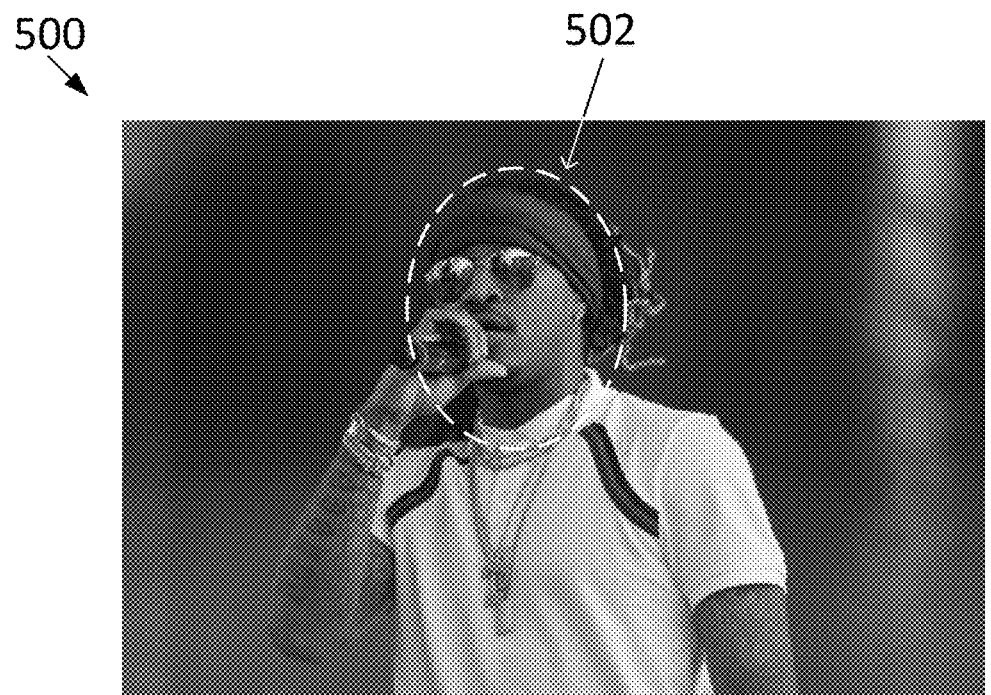
FIGS. 5A through 5J illustrate example screenshots of displayed interactive digital video content items and defined interactive regions, according to various embodiments.

With reference to FIG. 5A, a frame of digital video content item 500 is displayed, where digital video content item 500 shows a musician holding a microphone. Subject recognition is performed on digital video content item 500, and interactive region 502 is defined, such that a user interaction with interactive region 502 causes the presentation of content related to the visual subject in response to a user interaction with the interactive region during presentation of the digital video content item. For example, interaction with interactive region 502 during playback of digital video content item 500 may cause the device displaying digital video content item 500 to open a web address related to the displayed musician.

Figure 5B:
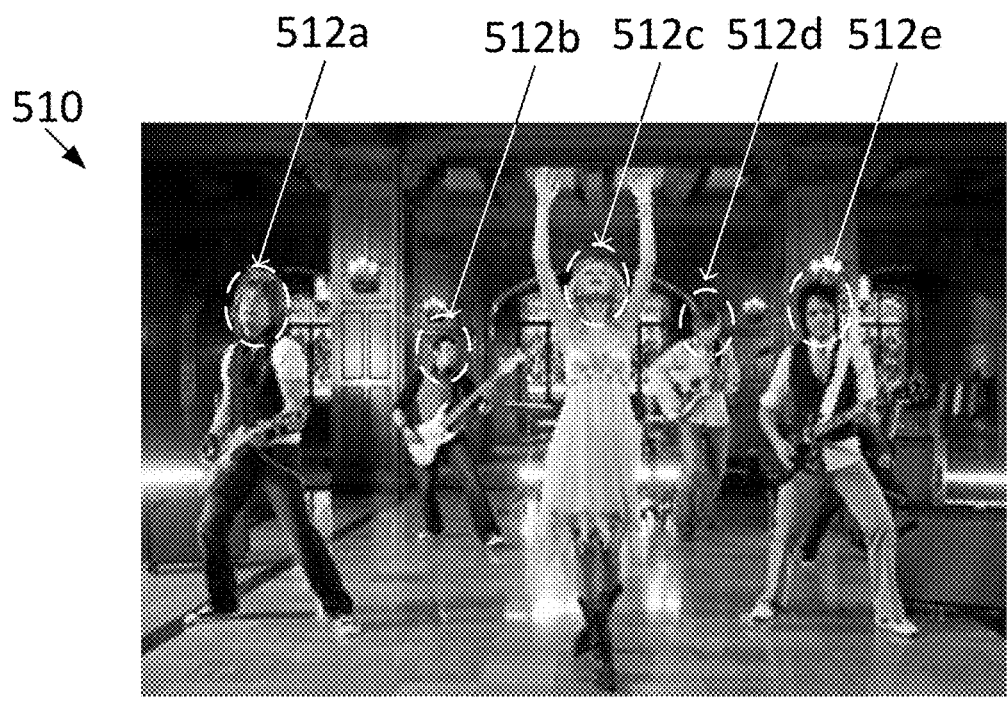

With reference to FIG. 5B, a frame of digital video content item 510 is displayed, where digital video content item 510 shows a musical performance by a band of five musicians. Subject recognition is performed on digital video content item 510, and interactive regions 512a through 512e are defined, such that a user interaction with interactive regions 512a through 512e causes the presentation of content related to the visual subjects associated with interactive regions 512a through 512e in response to a user interaction with the interactive regions during presentation of the digital video content item. For example, interaction with interactive region 512a during playback of digital video content item 510 may cause the device displaying digital video content item 510 to open a web address related to the band or the particular musician identified by interactive region 512a. It should be appreciated that the same content may be presented for more than one interactive region of one digital video content item.

Figure 5C:
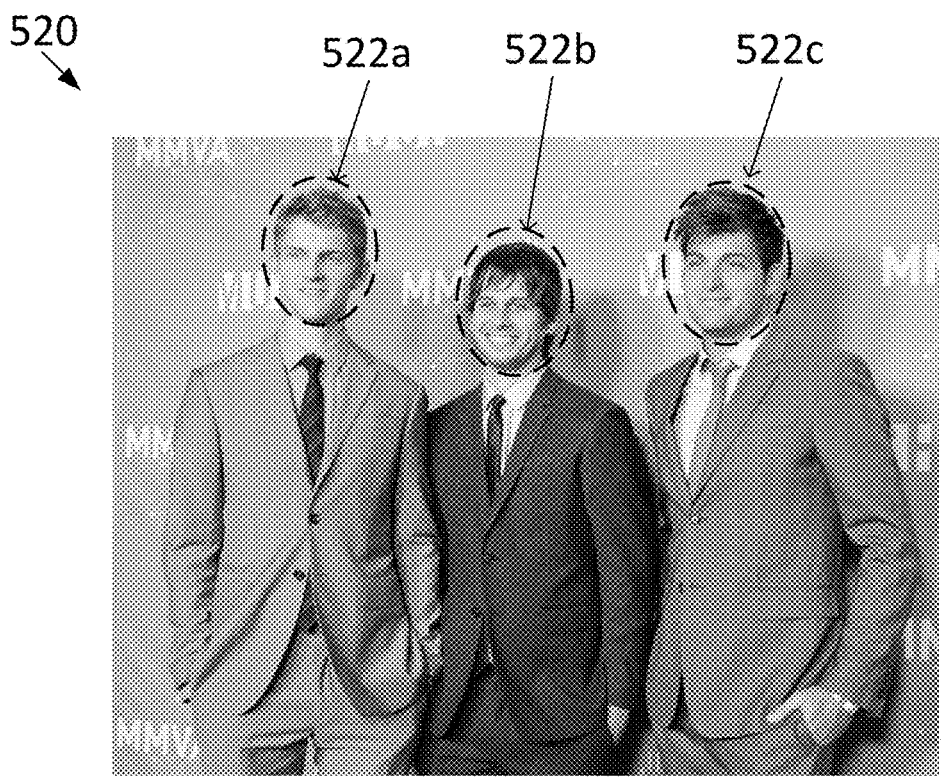

With reference to FIG. 5C, a frame of digital video content item 520 is displayed, where digital video content item 520 shows a video of three men. Subject recognition is performed on digital video content item 520, and interactive regions 522a through 522c are defined, such that a user interaction with interactive regions 522a through 522c causes the presentation of content related to the visual subjects associated with interactive regions 522a through 522e in response to a user interaction with the interactive regions during presentation of the digital video content item. For example, interaction with interactive region 522a during playback of digital video content item 520 may cause the device displaying digital video content item 520 to open a web address related to particular person identified by interactive region 522a or a web address related to the three men collectively. It should be appreciated that the same content may be presented for more than one interactive region of one digital video content item.

Figure 5D:
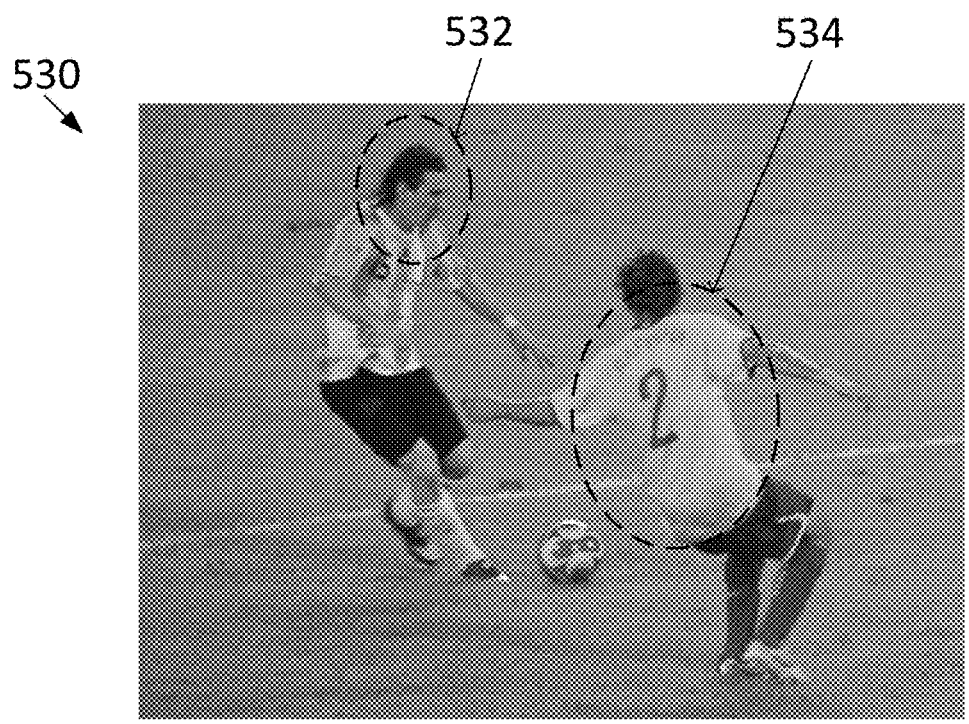

With reference to FIG. 5D, a frame of digital video content item 530 is displayed, where digital video content item 530 shows a scene from a soccer match including two soccer players. Subject recognition is performed on digital video content item 530, and interactive regions 532 and 534 are defined, such that a user interaction with interactive regions 532 and 534 causes the presentation of content related to the visual subjects associated with interactive regions 532 and 534 in response to a user interaction with the interactive regions during presentation of the digital video content item. For example, facial recognition is performed on digital video content item 530 and identifies the soccer player associated with interactive region 532. Object recognition is also is also performed on digital video content item 530 and identifies the soccer player associated with interactive region 534 based on the uniform (e.g., since the soccer player's face is not visible). Interaction with interactive region 532 during playback of digital video content item 530 may cause the device displaying digital video content item 530 to open a web address related to the soccer player identified by interactive region 532 and interaction with interactive region 534 during playback of digital video content item 530 may cause the device displaying digital video content item 530 to open a web address related to the soccer player identified by interactive region 534.

Figure 5E:

With reference to FIG. 5E, a frame of digital video content item 540 is displayed, where digital video content item 540 shows a rear view from a boat with a United States flag. Subject recognition is performed on digital video content item 540, and interactive region 542 is defined, such that a user interaction with interactive region 542 causes the presentation of content related to the visual subject in response to a user interaction with the interactive region during presentation of the digital video content item. For example, interaction with interactive region 542 during playback of digital video content item 540 may cause the device displaying digital video content item 540 to open a web address related to the United States.

Figure 5F:
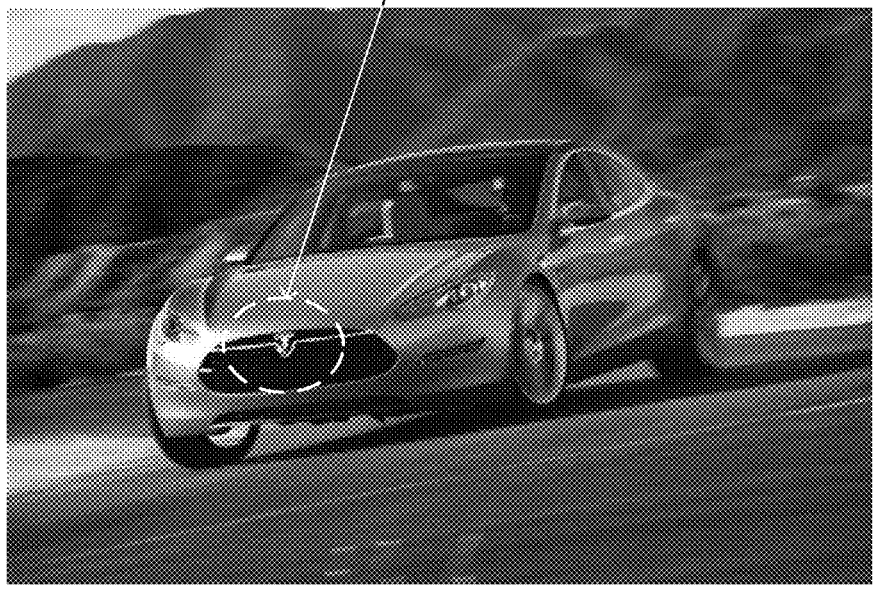

With reference to FIG. 5F, a frame of digital video content item 550 is displayed, where digital video content item 550 shows an automobile. Subject recognition is performed on digital video content item 550, and interactive region 552 associated with the logo of the automobile is defined, such that a user interaction with interactive region 552 causes the presentation of content related to the visual subject in response to a user interaction with the interactive region during presentation of the digital video content item. For example, interaction with interactive region 552 during playback of digital video content item 550 may cause the device displaying digital video content item 550 to open a web address related to the automobile.

Figure 5G:
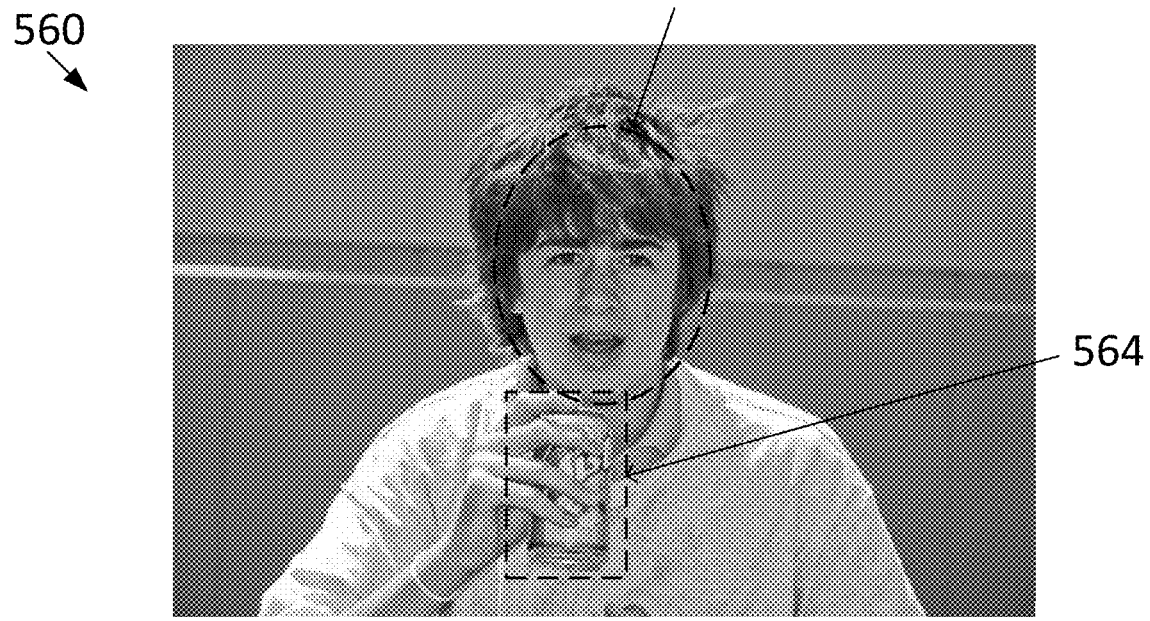

With reference to FIG. 5G, a frame of digital video content item 560 is displayed, where digital video content item 560 shows a scene of a teenager holding a beverage can. Subject recognition is performed on digital video content item 560, and interactive regions 562 and 564 are defined, such that a user interaction with interactive regions 562 and 564 causes the presentation of content related to the visual subjects associated with interactive regions 562 and 564 in response to a user interaction with the interactive regions during presentation of the digital video content item. For example, facial recognition is performed on digital video content item 560 and identifies the teenager associated with interactive region 562. If the subject is not identified, e.g., the face of the teenager is not identified by facial recognition because the teenager is not recognized, no interactive region 562 is defined. In some embodiments, subject recognition can be performed and recognize the teenager as "human, teenager" and define interactive region 562 as such. Object recognition is also performed on digital video content item 560 and identifies the brand of the beverage, e.g., using the logo. Interaction with interactive region 562 during playback of digital video content item 560 may cause the device displaying digital video content item 560 to open a web address related to the teenager identified by interactive region 562 and interaction with interactive region 564 during playback of digital video content item 560 may cause the device displaying digital video content item 560 to open a web address related to the beverage identified by interactive region 564, for example, the web address to purchase that beverage online directly. The purchase driven by the recognition of interactive region 564 may include an affiliate fee that the website where the transaction is conducted may pay to the creator of the interactive region.

Figure 5H:

With reference to FIG. 5H, a frame of digital video content item 570 is displayed, where digital video content item 570 shows a scene of a model walking down a runway. Subject recognition is performed on digital video content item 570, and interactive regions 572 and 574 are defined, such that a user interaction with interactive regions 572 and 574 causes the presentation of content related to the visual subjects associated with interactive regions 572 and 574 in response to a user interaction with the interactive regions during presentation of the digital video content item. For example, facial recognition is performed on digital video content item 570 and identifies the model associated with interactive region 572. Object recognition is also is also performed on digital video content item 570 and identifies the dress worn by the model. Interaction with interactive region 572 during playback of digital video content item 570 may cause the device displaying digital video content item 570 to open a web address related to the model identified by interactive region 572 and interaction with interactive region 574 during playback of digital video content item 570 may cause the device displaying digital video content item 570 to open a web address related to the designer of the dress identified by interactive region 574 or may open a web address for the dress to purchase directly from the online store.

Figure 5I:
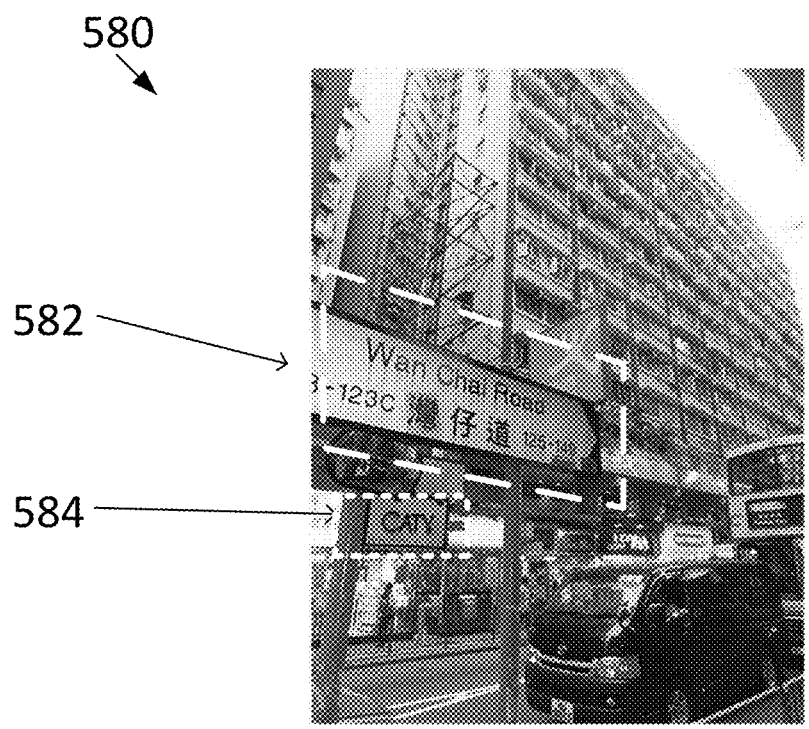

With reference to FIG. 5I, a frame of digital video content item 580 is displayed, where digital video content item 580 shows a scene of a busy street including a street sign and several store fronts. Subject recognition is performed on digital video content item 580, and interactive regions 582 and 584 are defined, such that a user interaction with interactive regions 582 and 584 causes the presentation of content related to the visual subjects associated with interactive regions 582 and 584 in response to a user interaction with the interactive regions during presentation of the digital video content item. For example, object recognition is performed on digital video content item 580 and identifies a street name associated with interactive region 582. Object recognition is also performed on digital video content item 580 and identifies the at least one store front associated with interactive region 584. Interaction with interactive region 582 during playback of digital video content item 580 may cause the device displaying digital video content item 580 to open a web address or mapping application associated with the street sign or location of the street sign. Interaction with interactive region 584 during playback of digital video content item 580 may cause the device displaying digital video content item 580 to open a web address related to the store identified by interactive region 584, for example, the web address for the store.

Figure 5J:
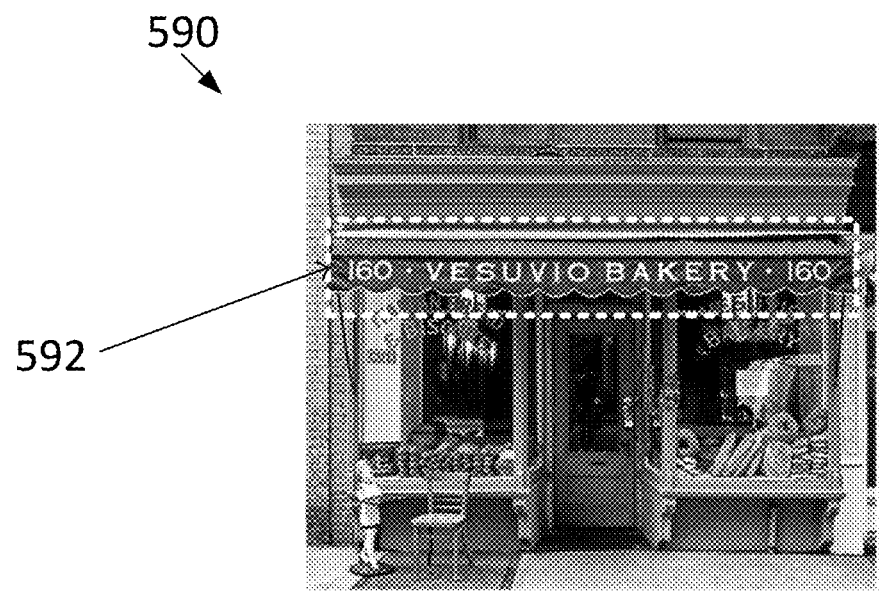

With reference to FIG. 5J, a frame of digital video content item 590 is displayed, where digital video content item 590 shows a scene of a bakery. Subject recognition is performed on digital video content item 590, and interactive region 592 is defined, such that a user interaction with interactive region 592 causes the presentation of content related to the visual subjects associated with interactive region 592. For example, object recognition is performed on digital video content item 590 and identifies the store associated with interactive region 592. Interaction with interactive region 592 during playback of digital video content item 590 may cause the device displaying digital video content item 590 to open a web address or mapping application associated with the store.

Figure 6:
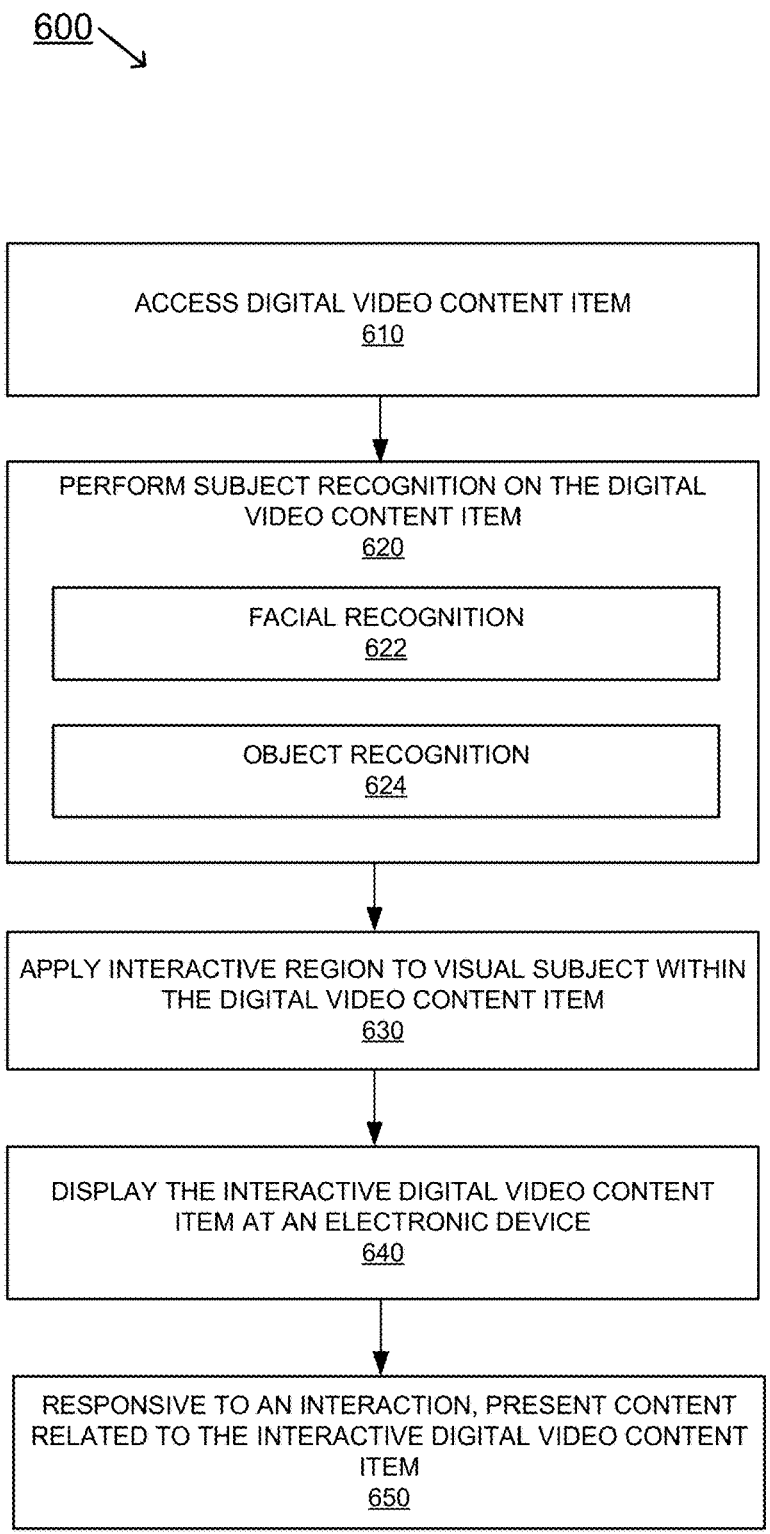
FIG. 6 illustrates a flow diagram of an example method for generating an interactive digital video content item, according to various embodiments.
Figure 7:
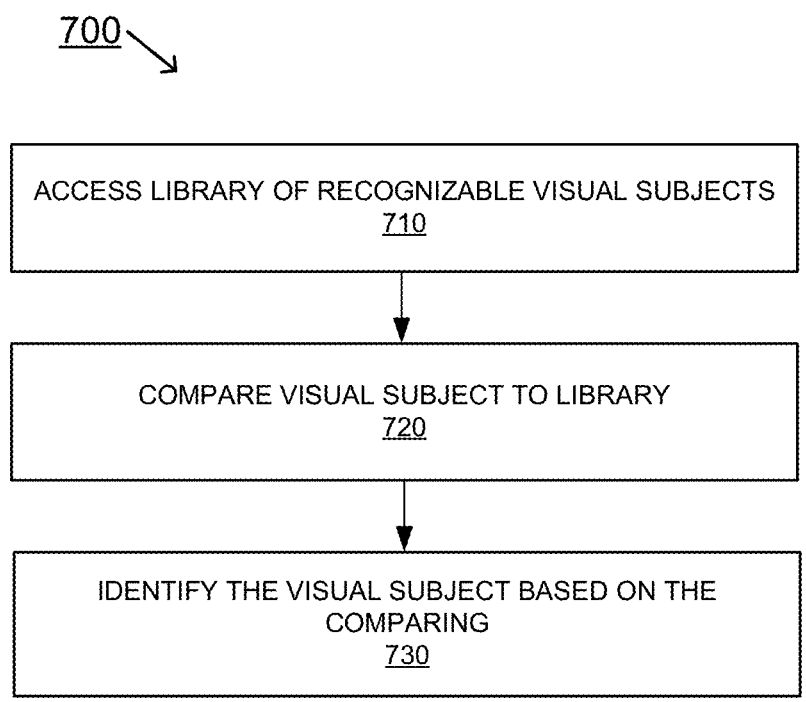
FIG. 7 illustrates a flow diagram of an example method for performing subject recognition on the digital video content item, according to various embodiments.

Example Methods of Operation of Generating and Using an Interactive Digital Video Content Item FIG. 6 illustrates a flow diagram 600 of an example method for generating an interactive digital video content item, according to various embodiments. FIG. 7 illustrates a flow diagram of an example method for performing subject recognition on the digital video content item, according to various embodiments. Procedures of this methods may be described with reference to elements and/or components of various figures described herein. It is appreciated that in some embodiments, the procedures may be performed in a different order than described, that some of the described procedures may not be performed, and/or that one or more additional procedures to those described may be performed. Flow diagrams 600 and 700 include some procedures that, in various embodiments, are carried out by one or more processors under the control of computer-readable and computer-executable instructions that are stored on non-transitory computer-readable storage media. It is further appreciated that one or more procedures described in flow diagrams 600 and 700 may be implemented in hardware, or a combination of hardware with firmware and/or software.

At procedure 610 of flow diagram 600, digital video content item is accessed. In one embodiment, the digital video content item is a short form looping prerecorded video file.

At procedure 620, subject recognition is performed on the digital video content item, wherein the subject recognition automatically identifies a visual subject within the digital video content item. In one embodiment, as shown in procedure 622, the subject recognition comprises facial recognition. In one embodiment, as shown in procedure 624, the subject recognition comprises object recognition. In one embodiment, the performing subject recognition on the digital video content item is executed according to flow diagram 700 of FIG. 7.

With reference to FIG. 7, at procedure 710 of flow diagram 700, a library of recognizable visual subjects is accessed. At procedure 720, the visual subject is compared to the library of recognizable visual subjects. At procedure 730, the visual subject is identified as a recognizable visual subject of the library of recognizable visual subjects.

With reference again to FIG. 6. responsive to identifying the visual subject, as shown at procedure 630, an interactive region is applied to visual subject within the digital video content item, wherein the interactive region enables presentation of content related to the visual subject in response to a user interaction with the interactive region during presentation of the digital video content item. In one embodiment, the content comprises a uniform resource locator.

In one embodiment, as shown at procedure 640, the digital video content item comprising the interactive region is displayed on a display device of an electronic device. At procedure 650, responsive to detecting an interaction with the interactive region, presenting the content related to the visual subject.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. Many aspects of the different example embodiments that are described above can be combined into new embodiments. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A method for generating an interactive digital video content item, the method comprising:
   accessing a digital video content item;
   performing facial recognition on a face of a human visual subject in the digital video content item to identify a person corresponding to the visual subject;
   in response to the facial recognition being unable to identify the person, performing subject recognition on the digital video content item, wherein the subject recognition automatically identifies the visual subject within the digital video content item as a category of human; and
   responsive to identifying the visual subject as a particular person or as a category of human, applying an interactive region to the visual subject within the digital video content item such that the interactive region overlays at least a portion of the visual subject and defines an area of the digital video content item for receiving a user interaction during presentation of the digital video content item, wherein the interactive region enables presentation of content related to the visual subject in response to a user interaction with the interactive region during presentation of the digital video content item, wherein the digital video content item is a short form looping prerecorded video file.

2. The method of claim 1, wherein the category of human comprises a teenager.

3. The method of claim 1, further comprising performing object recognition on a visual object in the digital video content item, wherein the object recognition automatically identifies the visual object within the digital video content item.

4. The method of claim 3 further comprising, responsive to identifying the visual object, applying an interactive region to the visual object within the digital video content item such that the interactive region overlays at least a portion of the visual object and defines an area of the digital video content item for receiving a user interaction during presentation of the digital video content item, wherein the interactive region enables presentation of content related to the visual object in response to a user interaction with the interactive region during presentation of the digital video content item.

5. The method of claim 1, wherein the performing subject recognition on the digital video content item comprises:
   accessing a library of recognizable visual subjects;
   comparing the visual subject to the library of recognizable visual subjects; and
   identifying the visual subject as a recognizable visual subject of the library of recognizable visual subjects.

6. The method of claim 1, further comprising:
   displaying the digital video content item comprising the interactive region on a display device of an electronic device; and
   responsive to detecting an interaction with the interactive region, presenting the content related to the visual subject.

7. A non-transitory computer readable storage medium having computer readable program code stored thereon for causing a computer system to perform a method for generating an interactive digital video content item, the method comprising:
   accessing a digital video content item;
   performing facial recognition on a face of a human visual subject in the digital video content item to identify a person corresponding to the visual subject;
   in response to the facial recognition being unable to identify the person, performing subject recognition on the digital video content item, wherein the subject recognition automatically identifies the visual subject within the digital video content item as a category of human; and
   responsive to identifying the visual subject as a particular person or as a category of human, applying an interactive region to the visual subject within the digital video content item such that the interactive region overlays at least a portion of the visual subject and defines an area of the digital video content item for receiving a user interaction during presentation of the digital video content item, wherein the interactive region enables presentation of content related to the visual subject in response to a user interaction with the interactive region during presentation of the digital video content item.

8. The non-transitory computer readable storage medium of claim 7, wherein the category of human comprises a teenager.

9. The non-transitory computer readable storage medium of claim 7, the method further comprising performing object recognition on a visual object in the digital video content item, wherein the object recognition automatically identifies the visual object within the digital video content item.

10. The non-transitory computer readable storage medium of claim 9, the method further comprising, responsive to identifying the visual object, applying an interactive region to the visual object within the digital video content item such that the interactive region overlays at least a portion of the visual object and defines an area of the digital video content item for receiving a user interaction during presentation of the digital video content item, wherein the interactive region enables presentation of content related to the visual object in response to a user interaction with the interactive region during presentation of the digital video content item.

11. The non-transitory computer readable storage medium of claim 7, wherein the performing subject recognition on the digital video content item comprises:
   accessing a library of recognizable visual subjects;
   comparing the visual subject to the library of recognizable visual subjects; and
   identifying the visual subject as a recognizable visual subject of the library of recognizable visual subjects.

12. The non-transitory computer readable storage medium of claim 7, the method further comprising:
   displaying the digital video content item comprising the interactive region on a display device of an electronic device; and
   responsive to detecting an interaction with the interactive region, presenting the content related to the visual subject.

13. The non-transitory computer readable storage medium of claim 7, wherein the content comprises a uniform resource locator.

14. The non-transitory computer readable storage medium of claim 7, wherein the digital video content item is a short form looping prerecorded video file.

15. A computer system comprising:
   a data storage unit; and
   a processor coupled with the data storage unit, the processor configured to:
   access a digital video content item;
   perform facial recognition on a face of a human visual subject in a digital video content item to identify a person corresponding to the visual subject;
   in response to the facial recognition being unable to identify the person, perform subject recognition on the digital video content item, wherein the subject recognition automatically identifies the visual subject within the digital video content item as a category of human; and
   responsive to identifying the visual subject as a particular person or as a category of human, apply an interactive region to the visual subject within the digital video content item such that the interactive region overlays at least a portion of the visual subject and defines an area of the digital video content item for receiving a user interaction during presentation of the digital video content item, wherein the interactive region enables presentation of content related to the visual subject in response to a user interaction with the interactive region during presentation of the digital video content item.

16. The computer system of claim 15, wherein the category of human comprises a teenager.

17. The computer system of claim 15, wherein the processor is further configured to perform object recognition on a visual object in the digital video content item, wherein the object recognition automatically identifies the visual object within the digital video content item.

18. The computer system of claim 15, wherein the processor is further configured to
   access a library of recognizable visual subjects;
   compare the visual subject to the library of recognizable visual subjects; and
   identify the visual subject as a recognizable visual subject of the library of recognizable visual subjects.

19. The computer system of claim 15, wherein the content comprises a uniform resource locator.

20. The computer system of claim 15, wherein the digital video content item is a short form looping prerecorded video file.

* * * * *